Dec. 15, 1970   D. H. WESTERHOFF ET AL   3,546,794
CONTROL SYSTEM FOR CONNECTING PLURAL INFORMATION
REPRODUCERS TO AN INFORMATION LIBRARY
Original Filed Nov. 12, 1965                                    4 Sheets-Sheet 1
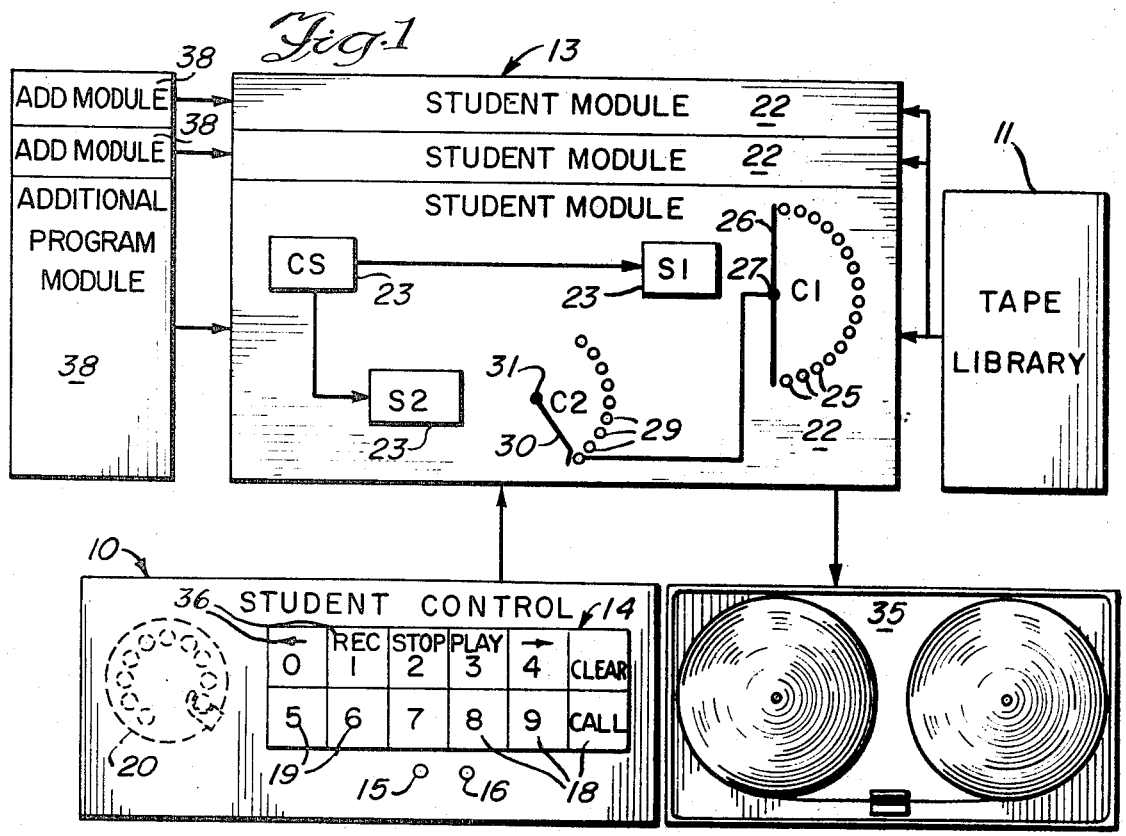
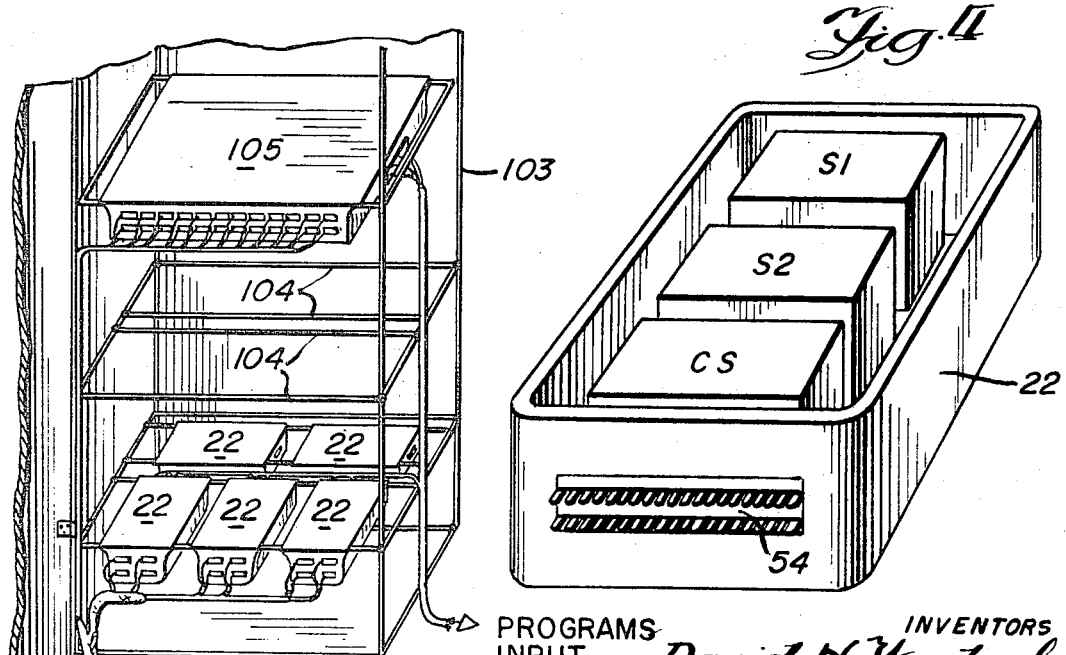
INVENTORS
David H. Westerhoff
Albert V. Flora
ATTORNEYS

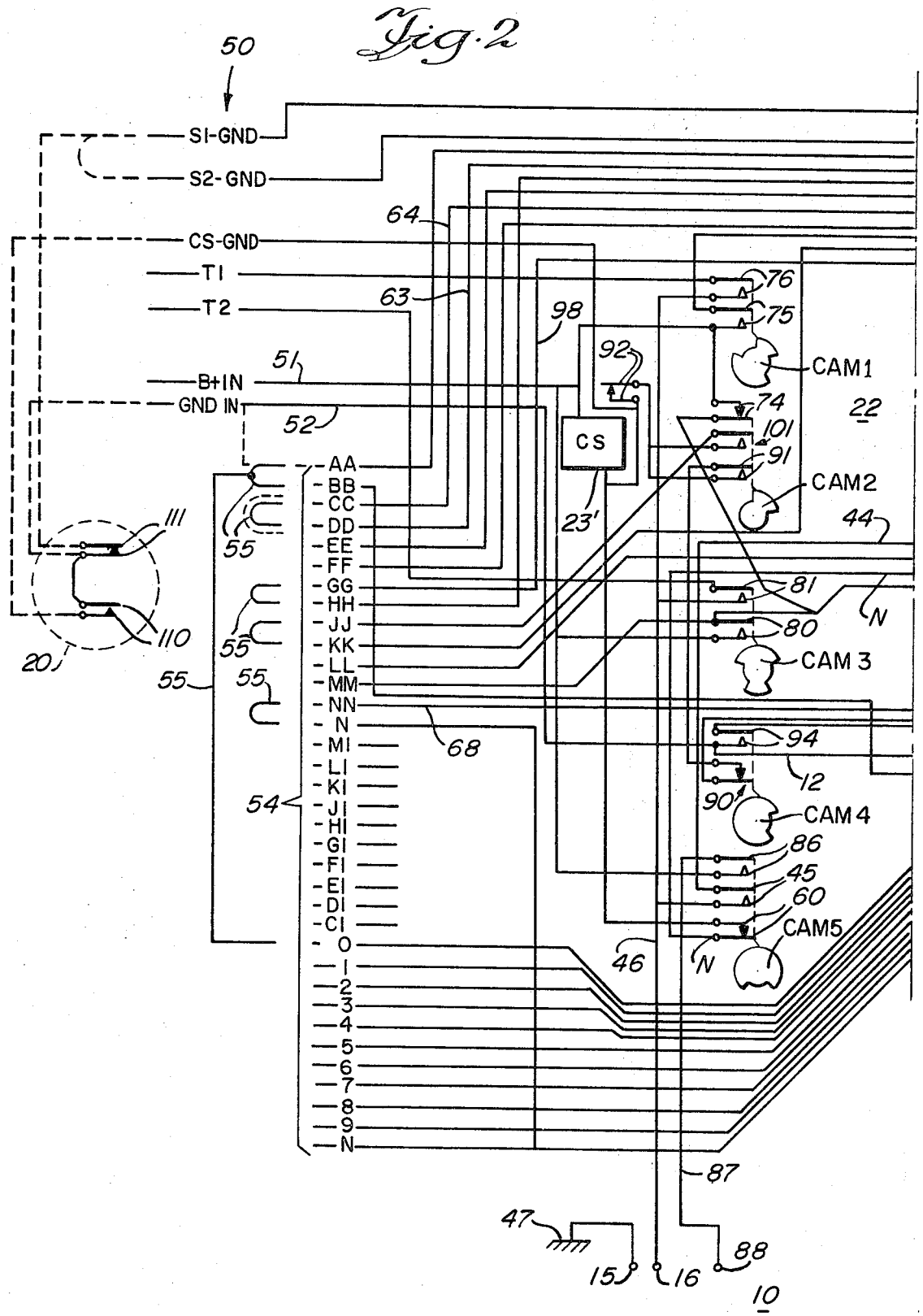

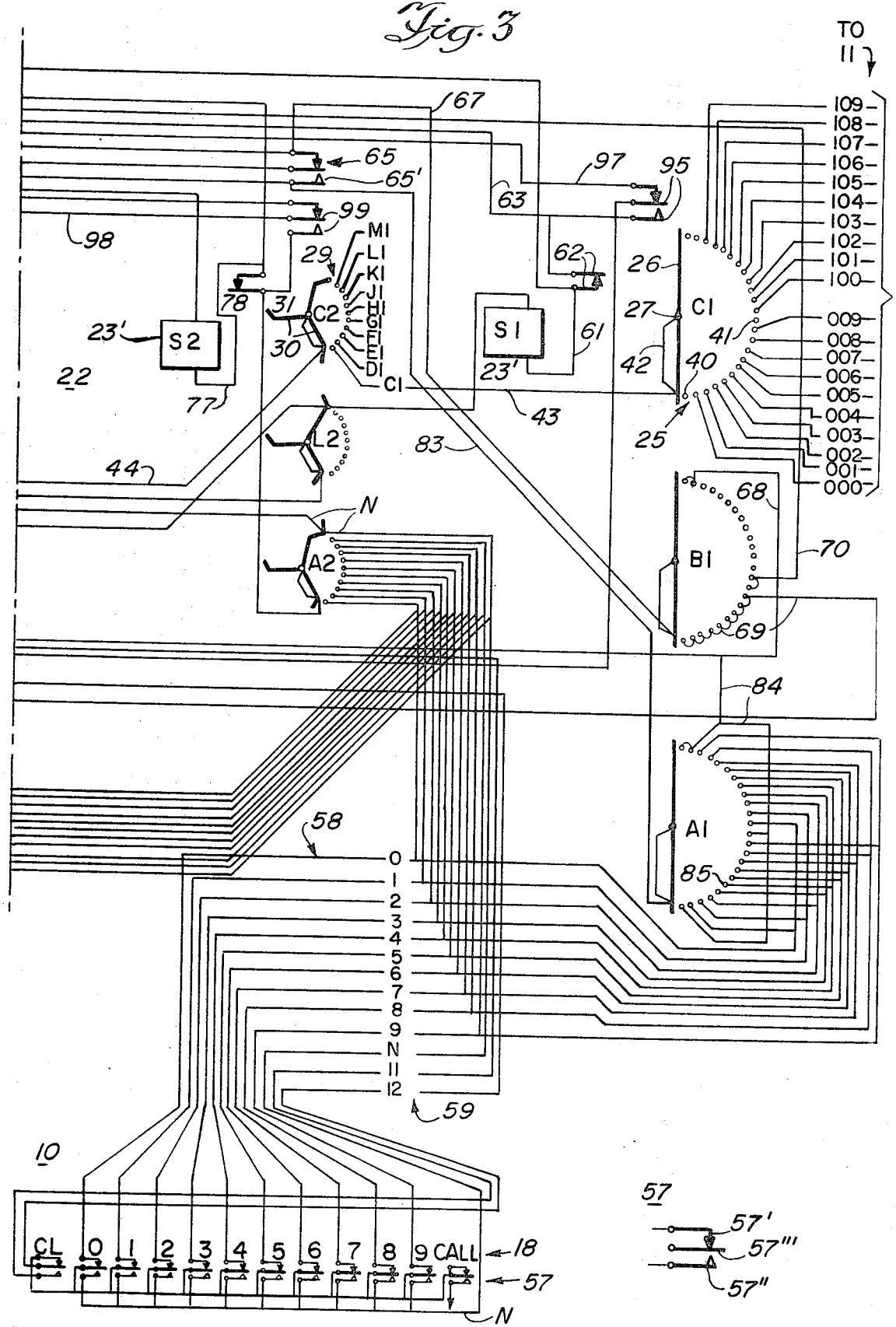

Dec. 15, 1970     D. H. WESTERHOFF ET AL     3,546,794
CONTROL SYSTEM FOR CONNECTING PLURAL INFORMATION
REPRODUCERS TO AN INFORMATION LIBRARY
Original Filed Nov. 12, 1965     4 Sheets-Sheet 4

*Fig. 6*

United States Patent Office

3,546,794
Patented Dec. 15, 1970

---

3,546,794
CONTROL SYSTEM FOR CONNECTING PLURAL INFORMATION REPRODUCERS TO AN INFORMATION LIBRARY
David H. Westerhoff, Munster, Ind., and Albert V. Flora, Chicago, Ill., assignors to Omni-Lab Incorporated, a corporation of Wisconsin
Continuation of application Ser. No. 507,470, Nov. 12, 1965. This application Aug. 4, 1969, Ser. No. 849,584
Int. Cl. G09b 5/04
U.S. Cl. 35—35        15 Claims

ABSTRACT OF THE DISCLOSURE

An educational laboratory with an independent switching module for each student booth to simultaneously connect any number of students to any program stored in a central program library. Each student booth has a plurality of individually actuable switches for selecting programs from the library. After connection to a selected program, the switching module disconnects the individually actuable switches from further control over program selection to allow control of peripheral equipment.

---

This application is a continuation of our application "Control System," S.N. 504,470, filed Nov. 12, 1965, and now abandoned.

This invention relates to a switching control system, and more particularly to a control system for individually connecting any number of first electrical elements to any single or any number of uniquely identified second electrical elements.

While the invention can be used in a wide variety of control applications, it will be illustratively described in connection with an educational teaching laboratory. In such an educational laboratory, a number of student booths or positions are connected through switching equipment to a central program library containing pre-recorded instructional material. A control unit is provided at each student booth which allows the student to select any desired program from the remote library. Such systems have become widely used for the teaching of languages, although the educational laboratory is equally adaptable for teaching other subjects in schools or in industry.

The switching equipment for an educational laboratory must accommodate a large number of student positions and programs, and be capable of controlling complementary peripheral equipment such as individual tape recorders located at each student booth. The student booth may typically include a pair of headphones for listening to the master recordings in the library, and a telephone-type dial for selecting any program in the central library. Such prior systems suffer several disadvantages when a number of students attempt to select programs at the same time, or additional peripheral equipment is to be controlled from the student position.

In prior educational laboratories, only one sudent at a time may be connected to the central library when a group of students in the same switching unit operate the student program selecting unit at the same time. For example, in switching equipment using line finders in conjunction with a telephone-type dial, only one student out of a group of ten may seize the program line finder at any one time. All other students hear busy signals until the first student finishes dialing, at which time the second student may then dial and when he finishes, the third may dial, and so on. If the program is, for example, identified by a three digit number, a considerable amount of time will elapse before the last student is connected with the program library. As a result, the later connected students may miss the beginning portion of the pre-recorded program. Such prior systems limit the ability of an instructor to work with a group of students at one time.

The line finder or similar operating type circuits also limit the number of programs which are economically available to each student at a reasonable cost. If a line finder circuit becomes defective, all the student positions served by that circuit become inoperative. Furthermore, once a student position has been installed employing the minimum basic equipment for selecting and listening to programs in the central library, the addition of peripheral student equipment requires that extra wires be pulled in from each booth to the remote control circuits.

In accordance with the present invention, all students can simultaneously connect to any one or any number of programs in the central library at the same time, eliminating the many disadvantages of prior systems. Furthermore, equipment such as student operated tape recorders may be added without requiring the addition of extra wires or control knobs and buttons.

One object of this invention is to provide an improved switching control system.

Another object of this invention is to provide a switching control system which is especially adapted for use in an educational laboratory.

One feature of this invention is the provision of a control unit which simultaneously connects any number of remote electrical elements to any one or any number of centrally located electrical elements.

Another feature of this invention is the provision of an improved control system having a selecting unit for connecting a line to one of a plurality of lines, and which additionally allows the selecting unit to be used to control peripheral equipment. The selecting unit is preferably automatically allowed to control the peripheral equipment immediately after a desired line has been selected.

Still another feature of this invention is the provision of an educational laboratory using a plurality of individually selectable elements, such as push buttons, each being identified by different indicia thereon, located at each student position for selecting programs from a central library.

Yet another feature of this invention is the provision of a switching control system using independent switching units for each line located at a switching position. The switching units simultaneously connect to a desired line each line having its associated switching unit arranged to select that desired line.

A further feature of this invention is the provision in a switching control system for connecting a first line to any one of a plurality of second lines, of a module unit for connection to the switching unit to add an additional number of lines which can be selected on the original equipment.

Other features and advantages of the invention will be apparent from the following description taken in connection with the accompanying drawings wherein:

FIG. 1 is a block diagram of the novel switching control system embodied in an educational laboratory;

FIGS. 2 and 3, taken together, are a schematic diagram of the invention;

FIG. 4 is a diagrammatic illustration of a student module;

FIG. 5 is a diagrammatic illustration of the switching system rack mounted in a central location; and FIG. 6 is a schematic diagram of an additional program module for connection to the student module.

GENERAL DESCRIPTION

Turning now to FIG. 1, an educational laboratory is illustrated which embodies the switching control system. A student position 10 is provided for each student the laboratory is to serve. Such positions commonly take the form of individual student booths which are partially separated from each other to provide an isolated study area. Each booth 10 must be connected to a central program library 11 which contains a large number of individual programs each containing pre-recorded information. Each program in library 11 is uniquely identified by a sequence of indicia, as for example, a three digit number.

In accordance with the present invention, electrical connecting equipment 13 is provided for simultaneously connecting each student position 10 to any program in library 11 when those programs are selected at the student positions. For example, all student positions can simultaneously be connected to the same program in library 11, or to any number of different programs in the library.

A selecting unit 14 is located at each student position 10 for choosing the desired program from the remote library. Equipment 13 connects the program output from library 11 to a pair of output terminals 15, 16 located at the student booth. These terminals may be connected, for example, to an information reproducer such as a pair of headphones which allow the student to listen to pre-recorded audio information on a program tape. Similarly, output terminals 15, 16 can be connected to a visual reproducer, such as a television receiver.

Selecting unit 14 is preferably formed from a plurality of elements 18, each of which is individually selectable by the student. Each element 18 has a different indicia 19 associated therewith for identifying the individual programs in library 11. In the present invention, ten push or touch buttons 18, labeled with numerals 0 through 9, are provided for selecting an individual program. Two additional push buttons, labeled "Clear" and "Call" are provided for controlling other equipment, as will appear. Thus, an individual program may be uniquely identified by a three digit sequence of indicia, as for example 005, and chosen by sequentially pushing the 0 button twice, and the 5 button once. The single program in library 11 identified as program number 5, will then be connected to output terminals 15, 16.

In place of individual elements 18, a single telephone-type dial 20 may be substituted therefor with appropriate changes in the wiring of the connecting equipment 13, as will appear later.

Simultaneously connecting equipment 13 is composed of an individual module, or switching unit, 22 for each student position 10. Each switching unit is electrically independent of the other switching units. Since each module 22 is connected through a relatively few number of electrical connectors or lines to a student position 10, and through a relatively large number of lines to each program in library 11, modules 22 are preferably housed at a cental location remote from each student position.

Each switching unit or module 22 is composed of a plurality of multiple bank (or cam) stepping relays 23. Each relay which has a plurality of wipers, each wiper being sequentially stepped over a plurality of contacts on a bank, is designated by the letter "S" followed by an identifying numeral. The banks of terminals are identified beginning with the letter "A" and followed by the same identifying numeral.

For example, relay S1 has associated therewith twelve banks of terminals labeled A1 through M1 (omitting I1). Banks A1 and B1 are for control purposes, as will appear. Banks C1 through M1 of relay S1 each contain a plurality of line terminals 25 which are individually connected through lines to a different program in library 11. A wiper 26 on each bank is incrementally stepped over each line terminal by relay S1, thereby sequentially connecting each terminal 25 to a common terminal 27 for each bank. According to one embodiment of the invention twenty (20) line terminals on each bank are connected to a different program in library 11. Each wiper 26 is electrically insulated from the remaining wipers, causing each of the ten common terminals 27 to have available up to twenty different programs. Thus, in the illustrative embodiment to be described in detail hereafter, each student can select any one of 200 programs available in library 11.

A bank selection relay S2 has two control banks A2, B2 and a single program carrying bank C2. A bank terminal 29 on bank C2 is provided for each bank C1 through M1 of relay S1. A line connects each bank terminal 29 on C2 to the corresponding common terminal 27 on the associated bank of relay S1. In FIG. 1, only the connection for bank C1 is illustrated. The second terminal 29 would be connected to the wiper of bank D1, and so on. A wiper 30, having a single common terminal 31, is incrementally stepped over bank terminals 29 by relay coil S2.

A recognition stepping relay CS is operatively connected to relays S1 and S2 for controlling the overall operation of switching unit 22. Relay CS recognizes the order in which push buttons 18 are selected and energizes the proper relay S1 or S2 at the proper time. Relay CS thus causes relay S2 to step to the correct bank terminal 29, and thereafter steps all wipers 26 of relay S1 to the proper position where the selected program is located. The desired program from library 11 is coupled through wiper 26 and its connected bank terminal 29 to wiper 30. Single terminal 31 of wiper 30 is thereafter connected with one of the output terminals 15, 16 at student position 10, thus completing the switching operation.

Also in accordance with the present invention, switching units 22 automatically disconnect push buttons 18 from further control over the selection of programs when the last number in the sequence of digits identifying a program is selected. The push buttons may now be used to control additional peripheral equipment, such as a student tape recorder 35 located, for example, at each student booth. For this purpose, extra indicia 36 are carried on push buttons 0 through 4 for controlling the recorder in a known manner. Buttons 0 through 4 correspond respectively to rewind, record, stop, play and forward. Other types of tape recording functions, normally provided by push-button control, could of course be utilized.

If desired, the push buttons not used to control tape recorder 35 could be connected for other instructional purposes. For example, buttons 5 through 9 could be provided with additional indicia (not illustrated) corresponding to answers to multiple choice questions contained on a program in library 11. The student's response to these questions would be indicated by pushing the corresponding push button suitably marked to indicate that answer. The outputs from such push buttons could be connected to the instructor's console, or to automatic testing equipment. Recorders 35 could be housed at a convenient central location for ease of servicing and to prevent misuse.

After a program has been selected on push buttons 18, or after a student has finished controlling additional equipment, the clear push button is depressed to disconnect that student booth 10 from the particular program previously selected.

Switching units 22 allow a large number of programs to be individually selected by any one student. If additional programs are later added to the tape library, an additional program module 38 may be connected to each individual switching unit 22. As will appear, module 38 allows any number of new programs to be added to library 11 and be selected on the original push-button unit 14.

SWITCHING CONTROL SYSTEM

In FIGS. 2 and 3, a schematic diagram of the switching control system is illustrated. All lines or wires leaving the right-hand side of FIG. 2 are connected to the corresponding lines on the left-hand side of FIG. 3.

The programs from library 11 are connected to line terminals 25 on banks C1 through M1 of relay S1 (only relay coil, causing the wipers to step to the next terminal. As a result, energized relay S1 steps self-interrupted until a connection to ground is no longer seen by the wiper of level B1. With the first step, the wiper of B1 is rotated off line 68 and is connected to the first line terminal. The first eleven line terminals are all interconnected by a line 69 to terminal BB of block 54. Terminal BB is jumpered to line 0. Since push button 0 has been depressed, the break contact 0 is open, thereby opening the ground path to the S1 relay coil. The wiper of B1, and hence all the mechanically connected wipers of relay S1, therefore rest on the first line terminal of each bank. Thus, the wiper of bank C1 will at this time be resting on terminal 40.

If the push button 1 had been depressed instead of push button 0, line 0 would have remained connected to line 12 and hence to ground 52, causing relay S1 to take another step. Ground would be completed, and relay S1 would take another step, each time the wiper of B1 was stepped on line terminals connected to line 69. When the B1 wiper is stepped onto the 10th and 11th terminals of B1, it is connected through a line 70 to terminal AA of block 54, and hence through the same jumper as terminal BB to line 0, again completing ground. However, when the B1 wiper is stepped on the 12th line terminal of B1, which is not connected to any line, the ground path to relay S1 is finally opened and the relay remains de-energized. At this time, the wiper of switch C1 would be resting on line terminal 41.

Releasing the button 0 opens the ground connection previously made to the CS relay, causing the cocked relay to take a single step. This, in turn, rotates cams 1 through 5 through one-fifth of a revolution. Since cams 1 and 2 are cut away in this portion, the SPST switches associated therewith change from their normal position. Thus, normally closed contacts 74 are opened, thereby disconnecting B+ from the S1 relay coil. At the same time, contacts 75 are closed, thereby connecting B+ to relay coil S2. Contacts 76 are similarly closed, connecting the audio tone T1 through line 46 to output terminal 16. When the student hears this tone, he knows the control system has responded to the previously selected push button.

As the student depresses the next push button in the sequence, for example 0, the ground side 77 of the S2 relay coil is connected through normally closed interrupter contacts 78 to the wiper of bank A2. Since the wiper is at this moment resting on line N which is connected through the depressed push button to line 12 (and hence ground 52), S2 takes one self-interrupted step. That is, the energized relay coil opens interrupter contact 78, causing the connected wipers of relay S2 to take a single step while contact 78 is at the same time closed. The wiper on bank A2 continues to step across the line terminals which are connected through the corresponding push buttons to ground, until the wiper rests on the line terminal connected to the depressed push button. Thus, since push button 0 has been depressed, open circuiting line 0, relay S2 takes a single step and becomes de-energized. At this time, wiper 30 of bank C2 is resting on the bank terminal C1. In this manner, line 44 is connected through the wiper on bank C2 to the wiper on the bank of relay S1 which corresponds to the depressed push button. For example, if the push button 6 had been depressed, line 44 would be connected through wiper 30 to the wiper on bank J1 (which contains programs 60 through 69, and 160 through 169). During this time, relay CS has again been energized and hence cocked in the manner previously described.

Releasing the depressed push button again disconnects line N from ground line 12, thereby de-energizing relay CS and causing the cams to be rotated another one-fifth turn. At this time, only cams 2 and 3 have cut-away portions beneath their associated switches. The switches of cam 1 return to their normal position, thus opening contact 75 and removing B+ from relay S2. Contacts 80 of cam 3 close, thereby again connecting B+ to relay S1. At the same time, contacts 81 similarly close, thereby connecting the second tone source T2 through line 46 to output terminal 16. The student again hears an audible tone, but of different frequency from the previous tone, indicating the control unit has responded the second depressed push button. Since the tones do not perform any switching function, but are only provided for the student's benefit to indicate when a push button has been properly depressed, they may if desired be omitted.

As the last push button in the three digit program identifying number is depressed, line N is again connected to ground line 12, causing the CS relay to cock in preparation for taking a step. At the same time, ground is connected to ground line 61 of S1 through the following path. Line 61 is connected through contacts 62, line 63, jumpered terminals DD to CC, and line 64 to the center pole contact of switch 65. This switch is of the "off-normal" type, and is activated whenever the wipers of switch S2 have been stepped from their original position. Therefore, at this time the center pole contact of switch 65 is connected to the make contact 65', and through a connected line 83 to the wiper of bank A1. This wiper, which is mechanically connected to all the wipers of relay S1, is at this time either resting on the first terminal (corresponding to terminal 40 of C1) or on the middle 12th terminal (corresponding to terminal 41 on C1). In either case, the first and 12th terminals on bank A1 are connected together and through a line 84 to line 68 of B1. Line 68 in turn is jumpered through terminals NN to line N, thus completing the path to ground through the depressed push button.

Relay S1 now steps self-interrupted until the wiper on bank A1 is rotated over a line terminal which is not connected to ground through the push buttons. In the specific example of program 005, the push button 5 is depressed at this time. The wiper of bank A1 will step off the first line terminal and step self-interrupted (due to interrupter contact 62) across the next five line terminals. The sixth line terminal 85, connected to the open break contact of push button 5, breaks the ground path to relay S1. The mechanically connected wiper of bank C1 is at this time resting on the line terminal connected with program 005. Of course, if the original program selected had been 105, the wiper of bank C1 would have stepped six places off terminal 41 and be located on the terminal connected to line 105. Thus, the selected program is at this moment coupled through wiper 26, line 43, wiper 30 of C2, and through line 44 to the normally opened contacts of switch 45.

Releasing the last depressed push button removes ground from relay CS, causing the cams to rotate to the third position. In this position, only cams 2 and 5 have cut-out portions. The contacts 45 of cam 5 close, connecting line 44 through line 46 to output terminal 16, thus connecting the program from library 11 directly to the output terminal at the student booth. Contacts 80 of cam 3, which had previously been closed, are again returned to their normally open position, thus removing B+ from relay S2.

At the same time, while power is removed from a portion of the switching unit 22, a pair of contacts 86 of cam 5 close, connecting B+ through a line 87 to a power output terminal 88 located at the student booth. Terminal 88 can be used to power auxiliary equipment, such as tape recorder 35 of FIG. 1, which is to be activated automatically after the last push button in the program identifying sequence is depressed.

The rotation of cam 5 also opens the normally closed contacts 60 which connect the ground side of relay CS to line N. Thus, push buttons 18 are now inoperative from further controlling the relays in switching unit 22. Since the switching contacts of each of the push buttons are connected to terminal block 54, the push buttons may bank C1 being illustrated). Twenty-four (24) line terminals are provided on each bank. The first line terminal 40 is not connected to any program. The next ten line terminals on bank C1 are connected to the first ten programs 000 through 009. In a similar manner, the corresponding line terminals on bank D1 are connected to the next ten programs 010 through 019. The same terminals on the last bank M1 are connected with programs 090 through 099. Thus, the first half portion of the terminals on banks C1 through M1 are connected to the first 100 programs in the central library.

The middle line terminal 41 on each bank is not connected to any program in the library, and serves as a dividing point between the first and last 100 programs. The second hundred programs are connected in a similar manner to that described for the first hundred programs. That is, the first line terminal on bank C1 after terminal 41 is connected to program 100, and the last terminal on bank C1 is connected to program 109. The corresponding terminals on bank D1 are connected to programs 110 through 119, and so on.

Wiper 26 is sequentially stepped across the line terminals by S1 relay coil 23'. A jumper 42 connects common terminal 27 on wiper 26 with a line 43 connected to the bank terminal 29 for C2. Throughout the remaining specification, jumper wires similar to jumper 42 are used to indicate an electrical connection between the wiper itself and the line or wire, as line 43, which terminates at one end of the jumper wire. As the wiper is sequentially stepped by its relay coil, the line jumpered to the wiper is electrically sequentially connected with each terminal on the bank.

The general operation of the circuit of FIGS. 2–3 is as follows. If a program identified by a number from 000 to 099 is to be selected, push button 0 is depressed, causing the wipers 26 of S1 to take a single step and rest on terminals 40. The second depression of one of the push buttons 18 causes the wipers of relay S2 to step the number of positions equal to the digit selected. This results in terminal 31 of S2 being electrically connected to the wiper on relay S1 corresponding to the second selected digit. For example, if 0 was selected, wiper 30 would step to C1, thereby connecting the wiper 26 of C1 to terminal 31. On the third depression of one of the push buttons, the wipers of relay S1 step the appropriate number of positions to a specific line terminal connected with a program. Thus, if the push button 5 is depressed, wiper 26 steps six positions off terminal 40 and stops on the terminal connected to program 005. Similarly, if the first push button depressed was a 1 (indicating a program in the 100's) wiper 26 would at this time step six positions off terminal 41, stopping at the terminal connected to program 105.

Terminal 31 of S2 is connected through a line 44 to a pair of normally open switch contacts 45. As will appear, after the third digit is selected, contacts 45 close, thereby connecting line 44 through a line 46 to output terminal 16 at the student booth. In order to complete the program signal path, output terminal 15 is directly connected to a source 47 of reference potential, as chassis ground. Similarly, one of the pair of output terminals for each program in library 11 is connected to chassis ground 47.

Now considering the details of the circuit, an input terminal block 50 is provided for connecting various portions of the control circuit to external supplies or equipment. A line 51 is connected to the positive potential or B+ side of a DC voltage source (not illustrated). The negative side (or GND IN) of this source is connected to a line 52. A line T1 on terminal block 50 is connected to a tone source having an audible output frequency, such as 1000 cycles per second. Another line T2 is connected to a second tone source having a different output frequency, as 2000 cycles per second.

An output terminal block 54 is provided for connection to further external equipment. The dashed lines represent jumper wires which are connected to the corresponding opposite lines on block 54 when telephone dial 20 is used in place of the push buttons. When the push buttons are used, as is preferred and will be first described hereinafter, the solid jumper lines 55 are connected with the corresponding lines opposite thereto on terminal block 54.

Relay CS is a rotary stepping device which incrementally rotates five cams, labeled CAM–1 through CAM–5, about a central axis. The mechanically connected cams make one complete revolution for every five steps. A series of single pole single throw (SPST) switches are associated with each cam. When a cut-out portion of a cam is rotated under its associated SPST switches, the contacts change from the normal position illustrated in FIG. 2. A "Series OCS" cam relay manufactured by Automatic Electric (A.E.), a subsidiary of General Telephone and Electronics, is suitable for relay CS.

For the twelve bank stepping relay S1, a Type 45 rotary stepping switch of A.E. is satisfactory. The three bank control stepping relay S2 may be formed from a Type 44 rotary stepping switch of A.E. The A and B banks of these relays may be provided with bridging type wipers to prevent arcing and insure long life.

Each push button 18 independently controls a single pole double throw (SPDT) switch 57 associated therewith. Each switch 57 is of the momentary contact type, and has a break contact 57', a make contact 57'' and a movable pole contact 57'''. A plurality of electrical lines 58 connect switches 57, located at the student booth, to a switch input terminal block 59 on switching module 22. In addition to a single line connected to each break contact on push button switches 0 through 9, a neutral line N is connected to all the momentary make contacts of the program selecting switches. Furthermore, a pair of lines 11 and 12 are respectively connected to the make and pole contacts of the clear CL switch. Line 12 is also normally connected to the pole contact of each of the remaining switches through the CL make contact. A CALL push button is also provided, which may be connected to any desired circuitry (not illustrated), as for example an indicator light on an instructor's console, for obtaining the instructor's attention.

Assuming program 005 is to be selected, the first digit 0 of the sequence is selected by the manual depression of the corresponding push button. As a result, line 0 is momentarily disconnected from line 12, and line 12 (which is directly connected to battery ground 52) is momentarily connected to line N. The B+ input of CS relay coil 23' is directly connected to B+ line 51. The ground input to the CS relay coil is connected through a lower pair of switches 60 associated with CAM–5 to line N. As a result, the momentary depression of push button 0 connects the ground input of the CS relay coil to line 52, completing the power path and causing relay CS to cock in preparation for taking a step. Relay CS is constructed to rotate cams 1 through 5 when power is removed from its relay coil.

At the same time, the S1 relay coil 23' is connected to ground. That is, ground side 61 of S1 is connected to terminal DD of terminal block 54 by normally closed interrupter contacts 62 and a line 63. Terminal DD is jumpered to terminal CC and connected through a line 64 to the center pole contact of a SPDT switch 65. A line 67 connects the normally closed break contact of switch 65 with the wiper of bank B1. The wiper rests on the last line terminal of bank B1, which is connected through a line 68 to terminal NN of block 54. Since terminal NN is jumpered to line N, which at this moment is connected to ground line 52 through the depressed 0 button as previously described, the path to ground for the S1 relay coil is complete, thereby energizing relay S1.

Interrupter contacts 62 are activated each time relay S1 is energized, thereby opening the ground path for the immediately be used to control peripheral equipment. For example, buttons 0 through 4 could be connected to tape recorder 35 in FIG. 1 to control its functions in accordance with the extra indicia 36 located thereon. Power terminal 88 could similarly be connected to power the tape recorder. Thus, until the last push button is depressed, no power is connected to the recorder and hence the push buttons have no effect on its operation. However, after the last push button in the program identifying sequence has been depressed, the control circuit automatically connects power to the tape recorder and disconnects the push button from further control over the selection of programs. The student begins to hear the pre-recorded information, and at the same time can immediately control the operation of the tape recorder through the same push buttons without the necessity of selecting additional switches.

Other equipment, such as automatic quizzing devices, may be connected through terminal block 54 to the remaining push buttons 5 through 9, which similarly have been operatively disconnected from further control over the selection of programs. Other uses for the push buttons will be apparent to those skilled in the art.

The clear push button, labeled CL in FIG. 3, is used to activate the clearing sequence. The depression of this button causes the relays to return to their original state (as illustrated in the diagrams), thus disconnecting the previously selected program from the student booth, removing B+ from output power terminal 88, and operatively reconnecting the push buttons for further control over the selection of programs.

As button CL is depressed, line 12 (and hence ground 52) is connected through the make contact of the switch to line 11. Line 11 in turn is connected through the normally closed contacts 90 of cam 4 and the closed contacts 91 of cam 2 (due to the cut-away portion), and through interrupter contacts 92 of CS to the ground side of the CS relay coil. This causes relay CS to cock and at the same time open interrupter contact 92. causing relay CS to step self-interrupted one position. This causes the cams to rotate to the fourth position in which cams 1, 2, 3 and 4 have cut-away portions. The cut-away portion of cam 4 opens contacts 90, thereby opening the ground return path for relay CS to prevent further self-interrupted action.

The reset sequence for relays S1 and S2 is activated when the cams are in this fourth position. Contacts 80 of cam 3 close, connecting B+ in a manner previously described to relay S1. Contacts 94 of cam 4 similarly close, connecting ground 52 through the activated "off-normal contacts" 95 of S1 and the interrupter contact 62 of S1 to the ground side 61 of that relay. This causes S1 to step self-interrupted until the wipers have stepped to their home position (as illustrated in FIG. 3), at which time off-normal contacts 95 open, thus breaking the ground path for the relay coil.

The return of contacts 95 to their normal position (as illustrated in FIG. 3) now completes the ground path to relay S2 through a line 97, terminal HH, the jumper to terminal GG, and line 98 to the center pole contact of an off-normal switch 99 for S2. Since relay S2 was previously activated, and its wipers are off the home position, the center pole contact of 99 is at this time connected to its make contact, and through interrupter contact 78 to the ground side 77 of S2. Since contacts 75 of cam 1 are at this time closed, connecting B+ to S2, relay S2 now steps self-interrupted until its wipers have returned to the home position. At home, switch 99 opens, breaking the ground return path for relay S2.

The ground side of the CS relay coil is at this time completed to ground 52 through the following path. The interrupter contacts 92 of CS are connected through closed contacts 101 of cam 2 to terminal JJ of block 54. The jumpered terminal JJ is connected through KK to the off-normal switch 99 of S2. Since switch 99 has returned to normal, connection is made with line 98 and through jumpered terminals GG and HH to line 97. Line 97 in turn is connected through the off-normal switch 95 to contacts 94 of cam 4. Since these contacts are closed at this time, connection is made with ground 52, thus completing the ground path for relay CS. This causes relay CS to step self-interrupted one step, rotating the cams to the fifth (home) position at which no cam has a cut-away portion (the position illustrated in FIG. 2). As a result, contacts 94 open, preventing further self-interrupted stepping of relay CS.

During the clearing operation, in the fourth cam position, contacts 86 and 45 of cam 5 were opened, disconnecting B+ and the program from the student booth. The switching control system is now returned to its initial state in which push buttons 18 have control over the selection of programs.

As illustrated in FIG. 4, each switching unit 22 may be contained in a separate independent housing. Terminal blocks, such as 54, may protrude from each end thereof for connection to the external circuit. Each module 22 may be encapsulated in plastic.

As illustrated in FIG. 5, modules 22 are preferably located in a central location remote from the student position. A housing 103 having individual racks 104 may be provided for the modules. While it should be understood that each module 22 is electrically independent of all other modules, it is not in any way necessary that these units be mechanically separated as illustrated in FIG. 5. For example, the individual components forming six modules may all be contained in the same housing 105 and rack mounted in housing 103. A single housing for each module, as illustrated in FIG. 4, is, however, preferred for ease of maintenance. Thus, if a single student position becomes defective, it is necessary to remove only that single module, and the other student positions are not thereby effected.

TELEPHONE DIAL MODIFICATION

While the use of push buttons is preferred for control of the switching system, telephone-type dial 20 may be substituted therefor if the circuit is modified as illustrated by the dashed lines. In FIG. 2, the solid line jumper wires 55 are removed from terminal 54, and the jumpers and dial 20 illustrated by the dashed lines are connected to terminals 50 and 54. A pair of contacts 110 associated with dial 20 are closed as soon as the dial is moved from its normal position. These contacts remain closed until the dial returns to its normal position. A pair of contacts 111 close for each number on the dial. Thus, if the No. 5 is selected, five pulses will be produced by contacts 111. Dial 20 an dits associated contacts are, by themselves, entirely conventional and will not be described in more detail herein.

When the dial 20 is first pulled off normal, the CS ground line is connected through contact 110 to ground 52. When the dial is released, relay S1 is directly pulsed the appropriate number of steps by contacts 111, since these contacts are directly connected between ground 52 and the ground side 61 of S1. When the dial returns to normal, contacts 110 open, causing relay CS to take one step.

When the dial is pulled off normal the second time, relay CS again cocks. As the dial is released, relay S2 is directly pulsed the appropriate number of steps. Relay S1 is prevented from operating since B+ has been removed from its power terminal by contacts 80 of cam 3, in a manner as previously described. When the dial returns to normal position, relay CS again takes another step, rotating the cams to the second position.

The third time the dial is pulled off normal, relay CS again cocks. As the dial is released, relay S1 is directly pulsed the appropriate number of steps, since B+ has been connected thereto and removed from relay S2. When the dial returns to normal, relay CS again steps and rotates the cams to the third position, thus connecting the program from library 11 through the appropriate wiper of S1 to the wiper of C2, and thereafter through line 44 and contacts 45 to output terminal 16.

In order to clear the control system, the dial is pulled off normal to any digit and released. This causes contacts 110 to close, causing relay CS to take a fourth step. The cams will in turn be rotated to the fourth position, which automatically clears the circuit as previously described. That is, relays S1 and S2 will be stepped self-interrupted back to their home position, thereby activating relay CS and turning the connected cams to the fifth and home position.

ADDITIONAL PROGRAM MODULE

Student module 22 connects the student booth with any one of 200 programs. If additional programs are to be provided, an additional program module 38 may be connected to each student module 22 in the control system. Add module 38 allows the original student control position to select any number of additional programs. In FIG. 6, the detailed circuitry for one student module 38 is illustrated which allows the addition of 400 programs to the tape library. Thus, each student is able to simultaneously connect to any one of a total of 600 programs provided in the central library. The description of the circuitry and operation of FIG. 6 will indicate to those skilled in the art the manner in which any number of programs may be added to the library.

Rotary stepping relays S4 and S5 are provided which may be identical with the twelve bank relay S1 previously described. Relay S3 is a three bank control unit similar to relay S2 in FIG. 3. In addition to these relays, a slow release relay R1 is provided in FIG. 6. Relay R1 has a time delay of 35 milliseconds, for reasons which will be apparent hereinafter.

Module 38 is connected to each student module 22 through terminal block 54 illustrated in FIG. 2. For this purpose, all jumper wires are removed, and the appropriately labelled lines in FIG. 6 are inserted into the terminals of block 54 labelled with identical letter and number combinations.

In FIG. 6, banks A4 and A5 have line terminals that are directly connected with push buttons 0 through 9, in a manner identical with that shown for bank A1 in FIG. 3. For clarity, only a few of the lines have been labelled to indicate the terminal on block 54 they are connected with. Similarly, the wipers on relays S4 and S5 for each level C through M are electrically connected together and connected through appropriate lines (which in FIG. 6 are only indicated for the C level) with the corresponding wipers on C1 through M1 of relay S1. Thus, the wipers of banks C1, C4 and C5 are all electrically connected to the C1 bank terminal of C2, the wipers of banks D1, D4, and D5 are all electrically connected together to the D1 bank terminal of C2, and so on through bank level M. The other specific connections to terminal block 54 are drawn in detail in FIG. 6.

Additional program module 38 is composed of a control portion 115 and a switching portion 116. The operation of this circuit will now be described in conjunction with FIGS. 2 and 3. When the first push button in the sequence is depressed, relay CS cocks as previously described. In addition, S3 relay coil 23' in control portion 115 is energized through the following path. The B+ side 118 is connected through terminal LL to the wiper of B2 and through contact 74 of cam 2 directly to the B+ line 51. The ground side 119 of S3 is connected through interrupter contact 120 of S3, line 121 to the wiper of B3, and through the last connected terminal 122 on B3 to terminal N. As will be recalled, terminal N is connected through the depressed push button to ground 52. Thus, when the first push button is depressed, relay CS cocks and relay S3 is energized.

Relay S1, which heretofore had been energized at this time, is prevented from operating by opening its ground return path in two locations. As will be recalled, ground side 61 of S1 is connected through interrupter contact 62 and line 63 to terminal DD. In place of the direct jumper connection previously used, terminal CC is connected to the wiper of bank A3. Terminal DD (for energizing S1) is connected to the first two terminals of A3. The next two terminals on bank A3 are connected through a line 125 to the first, middle, and last terminals of bank A4, and the next two terminals on bank A3 are connected through a line 126 to similar terminals on bank A5.

Line N is no longer directly jumpered to terminal NN, but instead is connected through a pair of contacts 128 of relay R1 to the wiper of C3. Terminal NN is connected to the first two terminals of bank C3. The next two terminals of bank C3 are connected through interrupter contact 129 to the ground side of relay S4. Similarly, the fifth and sixth terminals of bank C3 are connected through interrupter contacts 130 to the ground side of relay S5.

As a push button is depressed, connecting line N to ground 52 as previously described, the ground path 119 of relay S3 is completed through interrupter contacts 120, line 121, and the wiper of B3 to line N. As a result, relay S3 steps self interrupted off terminal 122 (connected to line N) and to the first terminal on the bank. Since each push button is normally connected to ground 52, relay S3 will continue to step self interrupted until its wiper on bank B3 rests on the terminal connected to the depressed push button. At that time, the ground return path is broken and relay S3 is deenergized.

Banks A3 and C3 are now used to energize the correct relay S1, S4, or S5, depending on which push button has first been depressed. For example, if push button 0 had been depressed, the wiper on A3 would rest on the first terminal, thereby jumpering terminal CC and DD. Similarly, the wiper of C3 would rest on its first terminal, thereby jumpering line N to line NN. These connections would cause relay S1 to be energized in the manner previously described. If push button 2 had been depressed, the ground return path for relay S4 would be completed, causing relay S4 to step in a manner identical with that previously described for relay S1.

Relay R1 is used to open line N, thereby preventing the non-selected relays from being undesirably energized as the wipers of banks A3 and C3 sweep past their terminals. When relay R1 is energized, contacts 128 immediately open and remain open for 35 milliseconds, a time period slightly longer than the time necessary for the wipers of switch S3 to sweep past a single set of terminals. After this time period, contacts 128 again close. For example, when the push button 2 is depressed, relay S3 is energized, thereby activating interrupter contacts 120, and connecting the ground side of relay R1 through the make contact of switch 120 to ground. As a result, contacts 128 of R1 open, and remain open while the wiper on bank C3 steps across the first terminal. As the wiper on bank B3 is stepped self interrupted to the second terminal, the ground return path for relay R1 is again energized, causing contacts 128 to remain open. When the wipers of S3 reach the correct position, relay R1 is no longer pulsed and contacts 128 close, thereby completing the ground return path to the correct relay S1, S4 or S5 as previously described.

Relays S4 and S5 operate in a manner similar to that described for relay S1. After the selected relay S1, S4, or S5 has completed its stepping operation, relay S2 is energized in a manner similar to that previously described. For example, if relay S4 or S5 had been energized, their corresponding off normal contacts 132 and 133 would be activated, and a ground return path to relay S2 would be formed through circuitry corresponding to the same circuitry previously described for relay S1.

The depression of the second push button in the sequence therefore causes relay S2 to step as previously described to the correct bank. For example, if push button 5 was depressed at this time, line 44 would be connected through wiper 30 to banks H1, H4, and H5.

When the third digit is selected, the twelve bank relay first selected by S3 is stepped self interrupted to the terminal containing the desired program. As the push button is released, the selected program is connected through the wiper on its corresponding bank and through wiper 30 of C2 to output terminal 16. B+ is also connected at this time to power terminal 88, and the push buttons are disconnected from further control over the selection of programs, as previously described.

When the connected program is to be cleared, the student pushes clear push button CL. The relay S1, S4, or S5 which was energized is stepped self interrupted back to its home position. The path for relays S4 and S5 corresponds to that previously described for relay S1. After the relay first selected reaches its home position, relay S2 is stepped self interrupted back to home, as previously described.

When relay S2 is home, its off normal contacts are returned to the position illustrated in FIG. 3. At this time, the ground return path to relay S3 is completed, instead of the previously described path to relay CS. That is ground 52 is connected through closed contacts 94 of cam 4 and through off normal contacts 95 of S1 to terminal HH. Terminal HH is connected through the series connected off normal contacts 132 and 133 for relays S4 and S5 respectively to therminal GG. Returning to switching unit 22, terminal GG is connected through line 98 and through the off normal contacts 99 of S2 to terminal KK. As seen in FIG. 6, KK is connected to the center contacts 135 of off normal contacts 136 for relay S3. Since the wipers of S3 are at this time removed from their home position, center contact 135 of off normal switch 136 is at this time resting on the make contact. As a result, terminal KK is connected through interrupter contact 120 to the ground side 119 of S3. Relay S3 now steps self interrupted (due to contacts 120) back to its home position, at which time switch 136 is returned to normal breaking the ground return path for S3.

As the center pole contact 135 of switch 136 returns to its home position on the break contact, terminals KK and JJ are jumpered, thereby completing the ground return path to relay CS. The remaining clear operation occurs as previously described.

Programs in excess of 600 can be selected on the original push button if additional 12 bank stepping relays are added to the switching portion 116 of module 38. For example, programs numbered 600 through 799 could be controlled by the presently unused seventh and eighth contacts on banks A3 and C3. Control portion 115 would operate in the same manner as previously described, by completing the ground return path to the proper 12 bank stepping relay. After this operation is complete, relay S3 has no further control over the switching equipment until the clear operation is initiated. It will be apparent that module 38 allows additional programs to be selected on the original push buttons, while retaining the other advantageous features of the invention.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. In a system including a plurality of information reproducers, means defining a plurality of positions, each of said information reproducers being located at a different one of said positions, and a plurality of sources of information, each of said information sources being uniquely identified, a control system for selectively electrically coupling said information reproducers to said information sources, comprising:

means associated with each of said information reproducers for selecting any one of said information sources;

means responsive to said selecting means for simultaneously connecting at any time including at the same time to one of said information sources each of said information reproducers having its selecting means arranged to select that information source, including independent switching means for each selecting means, each of said switching means independently connecting to said one information source its corresponding information reproducer when said one information source is selected on its selecting means, each of said independent switching means comprises a plurality of bank means each having a common terminal electrically connectable with each of a plurality of line terminals, said plurality of line terminals being less than said plurality of information sources;

means connecting groups of different information sources to the line terminals on the bank means, each information source being connected to one line terminal, bank selection means having a single terminal electrically connectable with a bank terminal for each bank means, means coupling said single terminal to the information reproducer corresponding to that switching means, means coupling each bank terminal to the common terminal on the corresponding bank means, and recognition means responsive to said selecting means for operatively energizing said bank selection means to connect said single terminal to the bank terminal corresponding to the group of elements which includes the selected information source, and further responsive for operatively energizing the bank means associated with said last named group of elements to connect said common terminal to the line terminal coupled to said selected information source.

2. The control means of claim 1 wherein said selecting means includes an individually selectable element for each bank means, said recognition means being responsive to the selection of one of the selectable elements for electrically coupling said single terminal to the bank terminal connected with the corresponding bank means.

3. The control system of claim 2 wherein said recognition means includes means automatically responsive to the selection of one of said information sources for disconnecting at least a portion of said selectable elements from further control over the selection of information sources, allowing said portion of selectable elements to control additional equipment.

4. The control system of claim 3 wherein said selecting means includes clear means independent of said selectable elements for electrically disconnecting said single element from said connected information source and reconnecting said portion of selectable elements for further control over the selection of information sources.

5. The control system of claim 1 wherein each of said information reproducers extends to different student positions, program library means corresponding to said plurality of sources of information, said program library means being located in a central area remote from each of said student positions, and means mounting each of said independent switching means within said central area.

6. The control system of claim 1 including module means for each switching means, means connecting each of said module means with additional information sources in excess of said plurality of information sources, and means independently connecting each of said module means to its corresponding switching means, said connected module means and switching means being responsive to its corresponding selecting means for simultaneously connecting to any of the before named information sources each information reproducer having its selecting means arranged to select that information source.

7. The control system of claim 6 wherein each module means has a switching portion coupled to said additional information sources and a control portion, said control portion including first means coupling the selecting means associated with the corresponding switching means to said control portion, and second means responsive to said selecting means for energizing said switching means when said plurality of information sources are selected and energizing only said switching portion when said additional information sources are selected.

8. In an educational laboratory including means defining a plurality of student positions each having an information reproducer, and program library means having a plurality of programs containing information, each program being uniquely identified by a sequence of indicia, a control system, comprising:

selecting means associated with each reproducer, including a plurality of individually selectable elements having different indicia associated therewith, each element further having a switch coupled thereto independently actuated by the selection of its corresponding element; and independent switching means for each selecting means for simultaneously connecting at any time including at the same time to one of said programs in said library each of said reproducers at which the associated plurality of individually selectable elements are arranged in sequential selection corresponding to said sequence of indicia, including means for determining at least one of said sequence of indicia which uniquely identifies said programs, said determining means including bank means having a plurality of terminals each coupled to a different switch of the associated plurality of elements and wiper means sequentially connectable with the terminal next in sequence in response to each actuation of said bank means, and self-completing means connected in circuit with said wiper means and said switches for actuating said bank means each time said wiper means connects with a terminal coupled to an unactuated switch and for preventing actuation of said bank means when said wiper means connects with a terminal coupled to an actuated switch, thereby interrupting said self-completing means to cause said wiper means to remain contacting the terminal corresponding to an actuated switch.

9. The control system of claim 8 wherein said switching means includes means automatically responsive to the selection of the last indicia in said sequence for disconnecting at least a portion of said plurality of individually selectable elements from further control over the selection of programs, allowing said individually selectable means to each independently control a separate function associated with additional equipment immediately after the desired program has been selected.

10. The control system of claim 9 including an output terminal, a source of potential for powering at least a portion of said switching means, and enabling means responsive to said disconnecting means when said last indicia is selected for connecting said source of potential to said output terminal to power at least a portion of said additional equipment.

11. The control system of claim 10 wherein said enabling means is further responsive to the selection of said last indicia to remove said source of potential from at least a portion of said switching means.

12. The control system of claim 10 wherein said portion of selecting means comprises all of said selectable elements, said selecting means further including a clear element for disabling said disconnecting means, thereby reconnecting said selectable elements for control over the selection of said programs.

13. The control system of claim 8 wherein said information reproducer includes audio means for reproducing sound energy, and said switching means includes a source of a plurality of tones each of a different audio frequency, and means responsive to the selection of one of said elements for coupling one of said tones from said source to said audio means to indicate the actuation of the corresponding switch.

14. The control system of claim 8 wherein said elements comprise push buttons, the depression of said buttons thereby actuating said switches.

15. The control system of claim 8 wherein said selecting means includes an individually selectable clear element for disconnecting the program selected at that position from the corresponding reproducer.

References Cited
UNITED STATES PATENTS

| | | | |
|---|---|---|---|
| 3,199,226 | 8/1965 | Joslow | 35—35 |
| 2,224,244 | 12/1940 | Hicks | 179—6 |
| 2,328,562 | 9/1943 | Lesavoy | 179—6 |
| 3,199,226 | 8/1965 | Joslow | 35—35 |
| 3,273,260 | 9/1966 | Walker | 35—9 |
| 3,286,033 | 11/1966 | Lemelson | 179—6 |

WILLIAM H. GRIEB, Primary Examiner

UNITED STATES PATENT OFFICE
CERTIFICATE OF CORRECTION

Patent No. 3,546,794    Dated December 15, 1970

Inventor(s) David H. Westerhoff et al.

It is certified that error appears in the above-identified patent and that said Letters Patent are hereby corrected as shown below:

Column 4, lines 1 and 2, the word "hereafter" should read -- hereinafter --.

Column 4, line 58, the word "pro" should read -- pro-

Column 9, line 39, the number "92." should read -- 92,

Column 10, line 52, the word "an" should read -- and its --.

Column 13, line 29, the word "therminal" should read -- terminal --.

Signed and sealed this 23rd day of April 1974.

(SEAL)
Attest:

EDWARD M.FLETCHER,JR.
Attesting Officer

C. MARSHALL DANN
Commissioner of Pater